N. ROSEWATER.
PROCESS OF TREATING COFFEE BEANS AND OTHER SUBSTANCES AND PRODUCT RESULTING THEREFROM.
APPLICATION FILED AUG. 2, 1920.
1,400,992.
Patented Dec. 20, 1921.
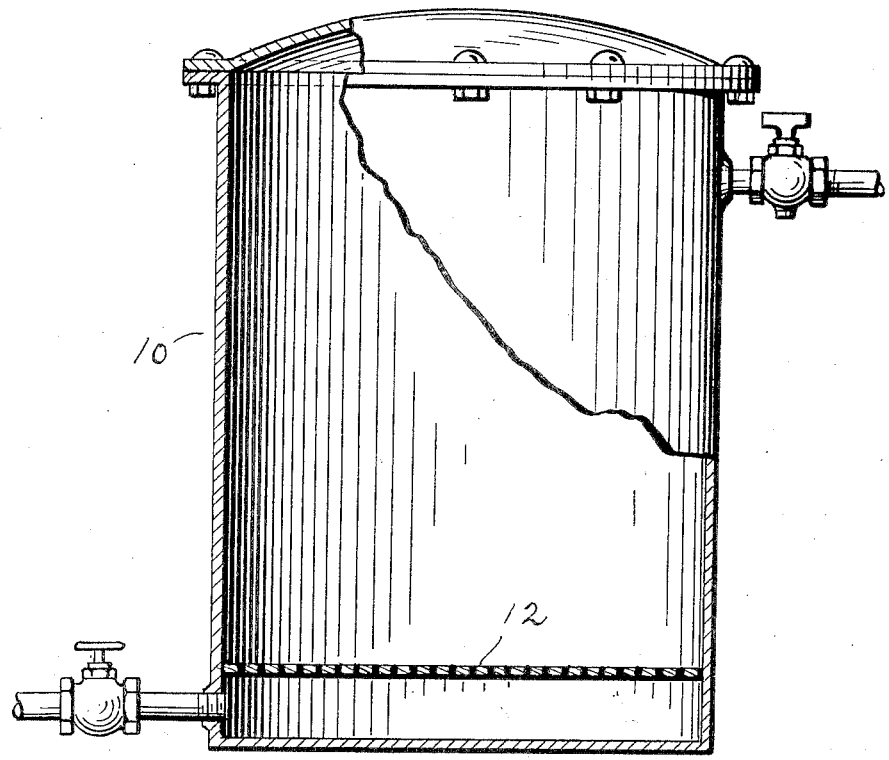
Inventor:
Nathan Rosewater
by Thurston Kwis & Hudson
his attorneys

UNITED STATES PATENT OFFICE.

NATHAN ROSEWATER, OF CLEVELAND, OHIO.

PROCESS OF TREATING COFFEE-BEANS AND OTHER SUBSTANCES AND PRODUCT RESULTING THEREFROM.

1,400,992. Specification of Letters Patent. Patented Dec. 20, 1921.

Application filed August 2, 1920. Serial No. 400,821.

*To all whom it may concern:*

Be it known that I, NATHAN ROSEWATER, a citizen of the United States, residing at Cleveland, in the county of Cuyahoga and State of Ohio, have invented a certain new and useful Improvement in Processes of Treating Coffee-Beans and other Substances and Product Resulting Therefrom, of which the following is a full, clear, and exact description.

The primary object of this invention is to produce a coffee bean product from which caffein and other volatilizable alkaloids have been removed, but which has not been materially altered in gross appearance, or cellular structure, or other essential characteristics; and to do this without employing any process that involves the use of chemicals or solvents which must be eliminated before the coffee beans can safely be used for food purposes.

The drawing is an elevation partly broken away of a receptacle in which the coffee or other substance may be treated as and for the purpose stated.

In carrying out the invention, for the purification of coffee, the whole green coffee beans are placed in a suitable steam tight receptacle 10, preferably resting upon a perforated diaphragm 12, therein. Then dry steam or hot air or gas is caused to flow through said receptacle under pressure at a temperature of approximately 250 to 400 degrees. The temperature should be high enough to volatilize the alkaloids, such as caffein, which it is desired to remove, but not hot enough to scorch or carbonize the coffee beans. The hot fluid employed is permitted to slowly escape through a suitable opening provided with a pressure valve 16, when steam is used. The volatile alkaloids, such as caffein will be volatilized and carried off with the escaping steam or hot air, and can be recovered by condensation if desired. Substantial volatilization of the caffein and the segregation thereof from the beans will be effected in from one half hour to several hours depending upon the temperature of the hot gas, the dryness of the beans, and other conditions.

When the alkaloids have, by the described process, been removed to the desired degree, the coffee beans will be found to be unchanged in appearance and in cellular structure and will have all of those qualities, except those imparted by the removed alkaloids. The so treated beans may be roasted in the usual way, and ground, and coffee beverage formed therefrom which will have substantially the same aroma and taste as the coffee beverage prepared from the ntural beans roasted and ground.

Although the process which has been described is of particular value in connection with the purification of whole green coffee beans for use as food, the same process may be used in connection with comminuted green coffee beans, with roasted coffee beans, whole or comminuted, or with any other cellular substance, whole or broken up, which contains caffein or other volatilizable alkaloids which it is desirable to remove, without using any chemical which must be subsequently removed.

Having described my invention, I claim:

1. The process of purifying substances composed of natural cellular structures containing volatilizable alkaloidal and other constituents which consists in subjecting them to the action of a gas or vapor heated to a temperature as great as that required to volatilize the volatilizable alkaloids therein without carbonizing the cellulose structure, and in segregating from the beans the volatilized alkaloids.

2. The described process of purifying cellular vegetable substances which contain volatilizable alkaloids, which consists in subjecting the same to a flowing stream of dry steam at a pressure above atmosphere and at a temperature as great as that at which the alkaloids will volatilize, but not as great as that at which the substance will carbonize.

3. The process of purifying substances composed of natural cellular structures containing xanthin and other constituents which consists in subjecting such natural cellular substances to a sufficiently prolonged and limited degree of heat at or above the vaporizing point of the contained alkaloids, whereby volatilization and removal of the contained xanthins is effected without materially altering the remaining constituents and without carbonizing the cellular structures.

In testimony whereof, I hereunto affix my signature.

NATHAN ROSEWATER.